United States Patent
Hsu

(10) Patent No.: US 7,399,550 B2
(45) Date of Patent: Jul. 15, 2008

(54) BATTERY MODULE FIXTURE

(75) Inventor: Cheng-Chung Hsu, Taipei (TW)

(73) Assignee: Inventec Corporation (TW)

( * ) Notice: Subject to any disclaimer, the term of this patent is extended or adjusted under 35 U.S.C. 154(b) by 299 days.

(21) Appl. No.: 11/378,830

(22) Filed: Mar. 17, 2006

(65) Prior Publication Data

US 2007/0065716 A1    Mar. 22, 2007

(30) Foreign Application Priority Data

Sep. 19, 2005    (TW) .............................. 94216079 U

(51) Int. Cl.
*H01M 2/10* (2006.01)
(52) U.S. Cl. ........................... 429/97; 429/100; 248/500
(58) Field of Classification Search ................. 362/382; 429/97, 100, 164; 428/500; 337/166, 188, 337/189
See application file for complete search history.

(56) References Cited

U.S. PATENT DOCUMENTS

| 7,318,731 B2 * | 1/2008 | Lin et al. ....................... 439/97 |
| 2006/0147794 A1 * | 7/2006 | Hakunti et al. .............. 429/100 |
| 2007/0072485 A1 * | 3/2007 | Lin et al. ..................... 439/527 |

* cited by examiner

*Primary Examiner*—Ali Alavi
(74) *Attorney, Agent, or Firm*—Peter F. Corless; Steven M. Jensen; Edwards Angell Palmer & Dodge LLP

(57) ABSTRACT

A battery module fixture applicable to a battery module having a first positioning portion is disclosed. The battery module fixture includes a base and a spring member. The base includes a second positioning portion having a first end for engaging with the first positioning portion, and a second end connected to the first end capable of being fixed to the first positioning portion. The spring member is capable of being fixed to the base, and includes a third positioning portion corresponding to the first end of the second positioning portion of the base, and a actuating portion for moving along with the third positioning portion, so as to break the third positioning portion away from the first end.

10 Claims, 8 Drawing Sheets

BATTERY MODULE FIXTURE

BACKGROUND OF THE INVENTION

1. Field of the Invention

The present invention relates generally to fixture designs, and more particularly, to a battery module fixture capable of being fixed to a battery module.

2. Description of Related Art

With progress of information industry, various kinds of electronic devices are spread to users of all ages. In order to extend the requirement for the processing information content and the operational efficiency, various electronic devices are confronted with the mutual common problem that is the time efficiency of the power supply, as to such a problem, except developing electricity-saving manner for the electronic device itself, the common approach is to add spare battery that is portable to the electronic device.

Taking the electronic device such as desktop personal computer, notebook computer or server for example, generally a cache memory is installed on a mainboard of the electronic device. When the electronic device is turned on, a power supply unit provides power to the cache memory for storing the data in the cache memory, thereby data can be temporarily stored in the cache memory and not be vanished. However, when the electronic device is shut down, the power supply unit can not provide power supply any more, and the data stored in the cache memory will be accordingly vanished. Therefore, in order to reserve the data, it is common to install a cache memory battery module in the electronic device.

However, a battery module assembled in the electronic device mostly employs a fixing structure, and a common approach is to lock and discharge lots of screws to the base or use the base with complicated structure, thereby the battery module can be assembled in the electronic device and disassembled from the electronic device by the base. Accordingly, when it is necessary to disassemble/assemble the battery module from/to the base, assistant tools must be used to disassemble/assemble, thus causing inconveniency to the user.

Simultaneously, when disassembling/assembling the battery module from/to the base by the fixing structure manner such as screw lock, action of disassembling and assembling the screw may be often affected by the circumstance, thus causing the screw to be dropped or lost. Therefore, such conventional technology not only makes disassembling and assembling process slowly and then wastes time, but also adds cost for purchasing screws.

In addition, when the base with complicated structure is applied in the battery module, aligning step in the assembly becomes quite difficult, and the fabricating cost is also increased because of the conventional base with over complicated structure. Furthermore, if such base is assembled in the finite space of the electronic device such as server, wherein the finite space includes multiple inner components and is full of wirings, which will be quite difficult and inconvenient to disassemble or assemble whether by tools or without arms. Thus, such conventional technology is required to be improved.

As described above, fixing technology of the conventional technology may waste time and force, tools must be adopted in assembly/disassembly, and it is not easy to align when assembling, thereby resulting in much inconveniency in assembly or disassembly without good utility value. Accordingly, there exists a strong need in the art for a fixing technology to quickly and simply assemble/disassemble without tools.

SUMMARY OF THE INVENTION

Accordingly, it is a primary objective of the present invention to solve the drawbacks of the aforementioned conventional technology by providing a battery module fixture, which performs assembly and disassembly without tools.

It is another objective of the present invention to provide a battery module fixture which makes assembly/disassembly quick and simple.

In order to attain the object mentioned above and the others, a battery module fixture is provided according to the present invention. The battery module fixture is capable of being fixed to a battery module having a first positioning portion. The battery module fixture includes a base and a spring member. The base includes a second positioning portion having a first end for engaging with the first positioning portion, and a second end connected to the first end for fixing to the first positioning portion. The spring member is capable of being coupled to the base, and includes a third positioning portion corresponding in position to the first end of the second positioning portion of the base, and an actuating portion for being actuated to separate the third positioning portion from the first end.

Preferably, the second positioning portion is an opening. The base further includes a first bonding section capable of being bonded to the spring member, and a second bonding section capable of being bonded to an electronic device. The first bonding section includes a plurality of first pilot holes, and the second bonding section includes a plurality of second pilot holes. The spring member can be, e.g., a leaf spring. The third positioning portion is one selected from the group consisting of a lug, a stopper, a bearing rib and a lock. The actuating portion is buckled upwards from one end of the spring member and wrapped downwards from the other end of the spring member, and is in the shape of a semicircle. The spring member further comprises a third bonding section, and the third bonding section includes, e.g., a plurality of holes.

Having the above-described structure, the battery module fixture according to the present invention can be easily assembled to the battery module, so that the battery module can provide power supply to the cache memory in the electronic device, and thereby data in the cache memory can be reserved.

Compared with the conventional technology, the present invention designs the base and spring member that can be assembled and disassembled without tools, thereby avoiding various problems, such that the process of disassembly and assembly is slowly and then wastes time, cost for purchasing screw is added, aligning step in the assembly is not easy, disassembly and assembly are difficult and inconvenient and the like, caused by locking/discharging lots of screws to the base or using the base with complicated structure in the conventional technology. Therefore, application of the present invention can perform assembly and disassembly without tools, and then assembly/disassembly can be performed quickly and simply.

Simultaneously, the battery module fixture according to the present invention can solve drawbacks, such that it may waste time and force, tools must be adopted in assembly/disassembly, and it is not easy to align when assembling, in the conventional technology, thus upgrading the value in use of industry relatively.

DETAILED DESCRIPTION OF PREFERRED EMBODIMENTS

Figure 1:
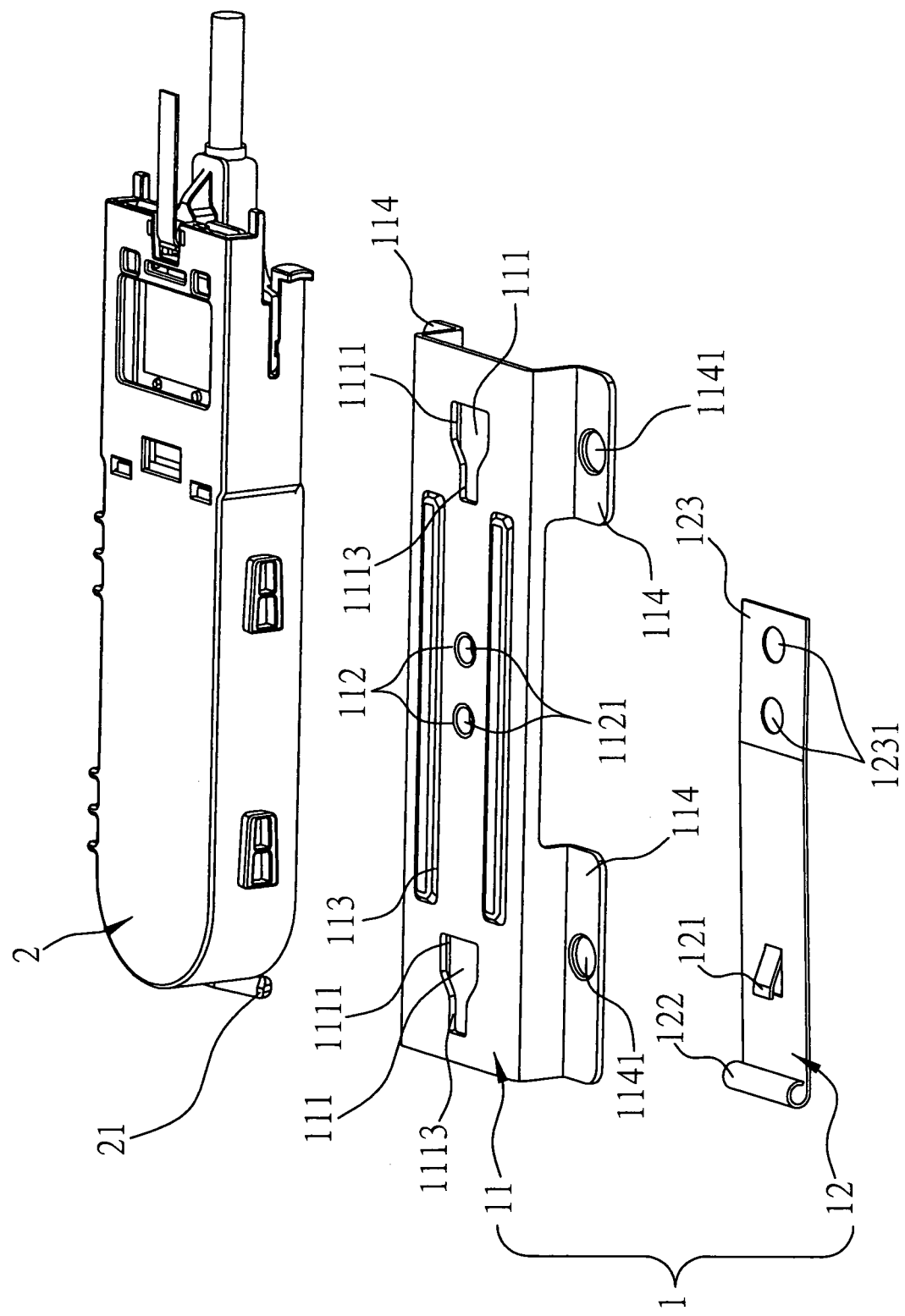
FIG. 1 depicts an exploded schematic diagram of a battery module fixture of the preferred embodiment according to the present invention and a battery module to which the battery module fixture is applied.

The following illustrative embodiments are provided to illustrate the preferred embodiment of the battery module fixture according to the present invention, these and other advantages and effects can be apparent to those skilled in the art after reading the disclosure of this specification. The present invention can also be performed or applied by other different embodiments. The details of the specification may be on the basis of different points and applications, and numerous modifications and variations can be devised without departing from the spirit of the present invention.

FIGS. 1 through 4 are schematic diagrams of a battery module fixture 1 of the preferred embodiment according to the according to the present invention. Please refer to FIG. 1. The battery module fixture 1 is capable of being fixed to a battery module 2 having a first positioning portion 21. The battery module fixture 1 comprises a base 11 and a spring member 12, which is capable of being bonded to the base 11.

It should be understood that the battery module fixture in the following embodiment is applied to the battery module 2, and the battery module 2 is used in any kinds of electronic devices, such as a desktop personal computer, a notebook computer or a server. The following embodiment is taken the battery module used in the electronic device such as server for description, but the present invention is not limited to this. Simultaneously, since desktop personal computer, notebook computer, or other correlative electronic device with cache memory, and battery module are applicable objects, their structure are not changeable, for simplicity, in order to illustrate the feature and structure of the present invention in a more clear and concise manner, merely the structure directly pertaining to the present invention is illustrated, the other is left out.

Figure 2:
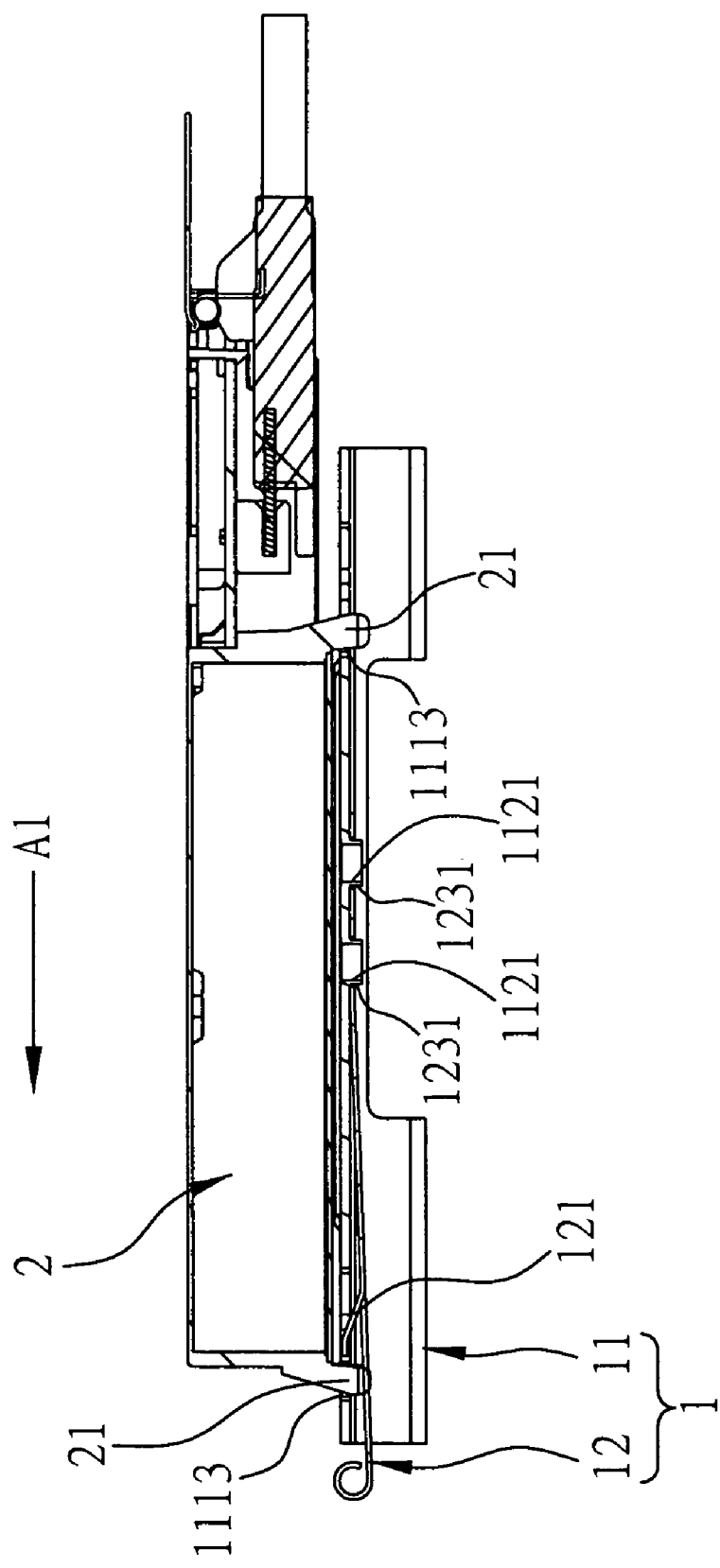
FIG. 2 depicts a right side view of the battery module fixture and the battery module shown in FIG. 1 when the battery module fixture is fixed to the battery module.
Figure 3A:
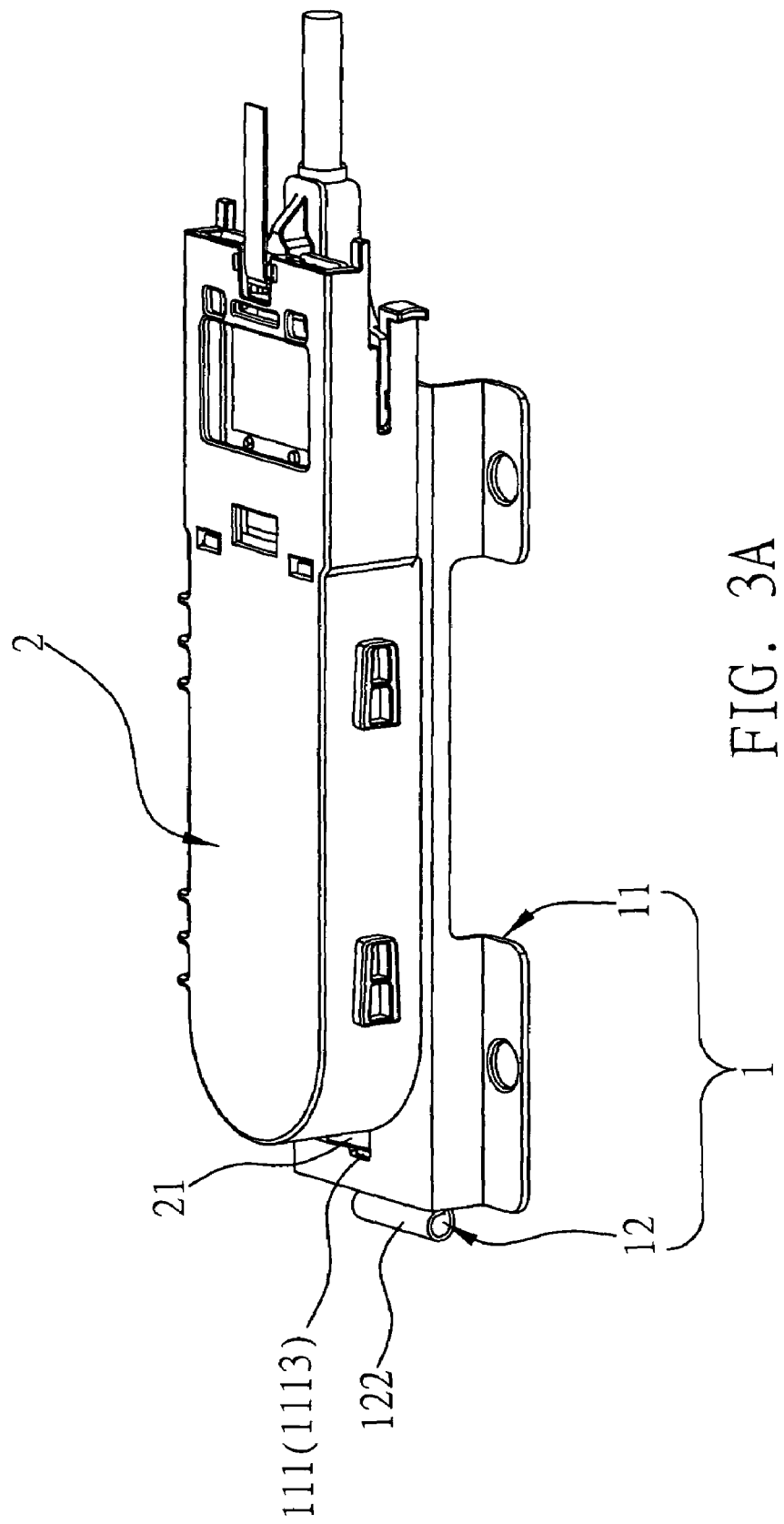
FIG. 3A depicts a schematic diagram of the battery module fixture and the battery module shown in FIG. 2.
Figure 3B:
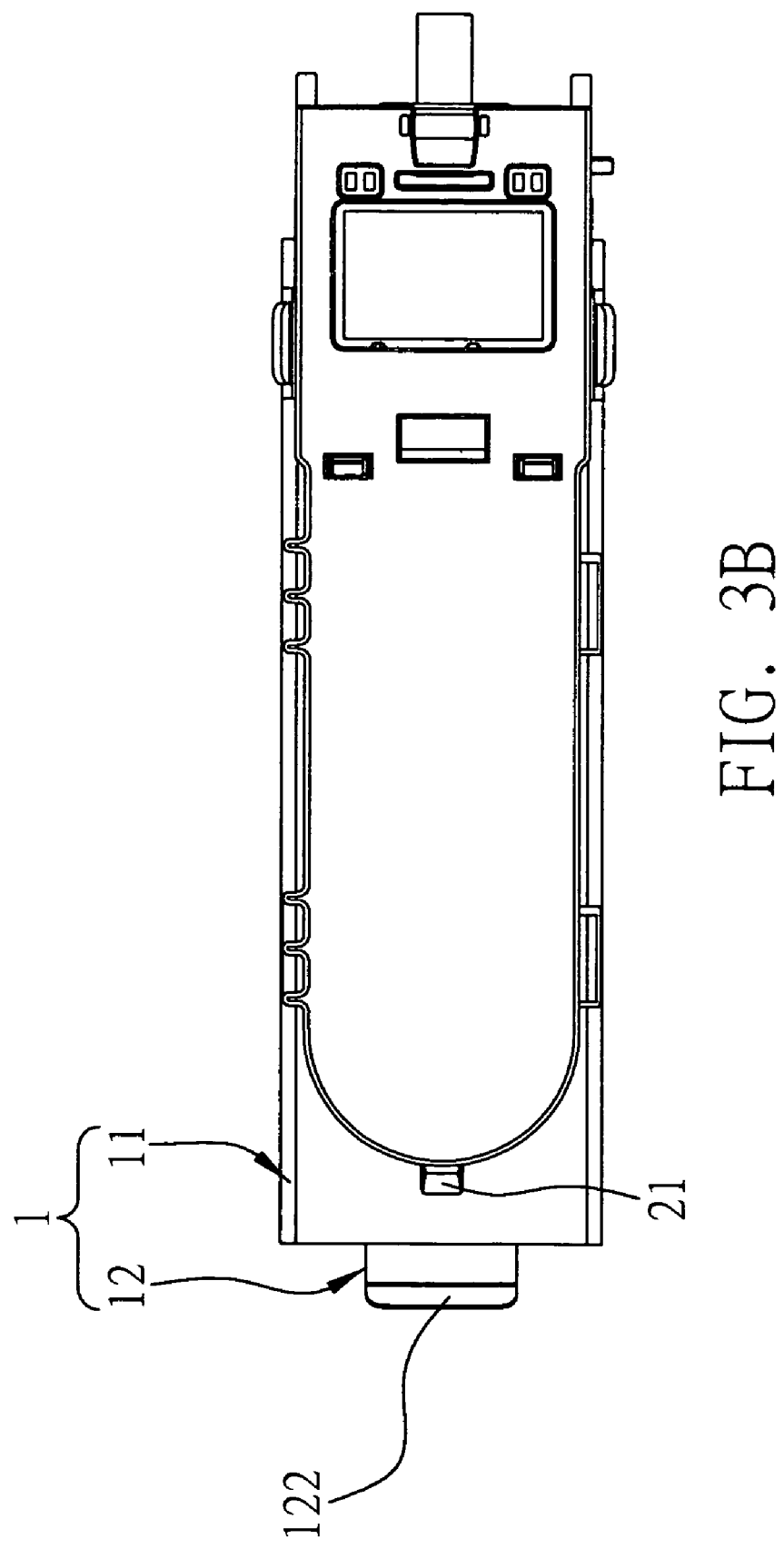
FIG. 3B depicts a top view of the battery module fixture and the battery module shown in FIG. 2.
Figure 3C:
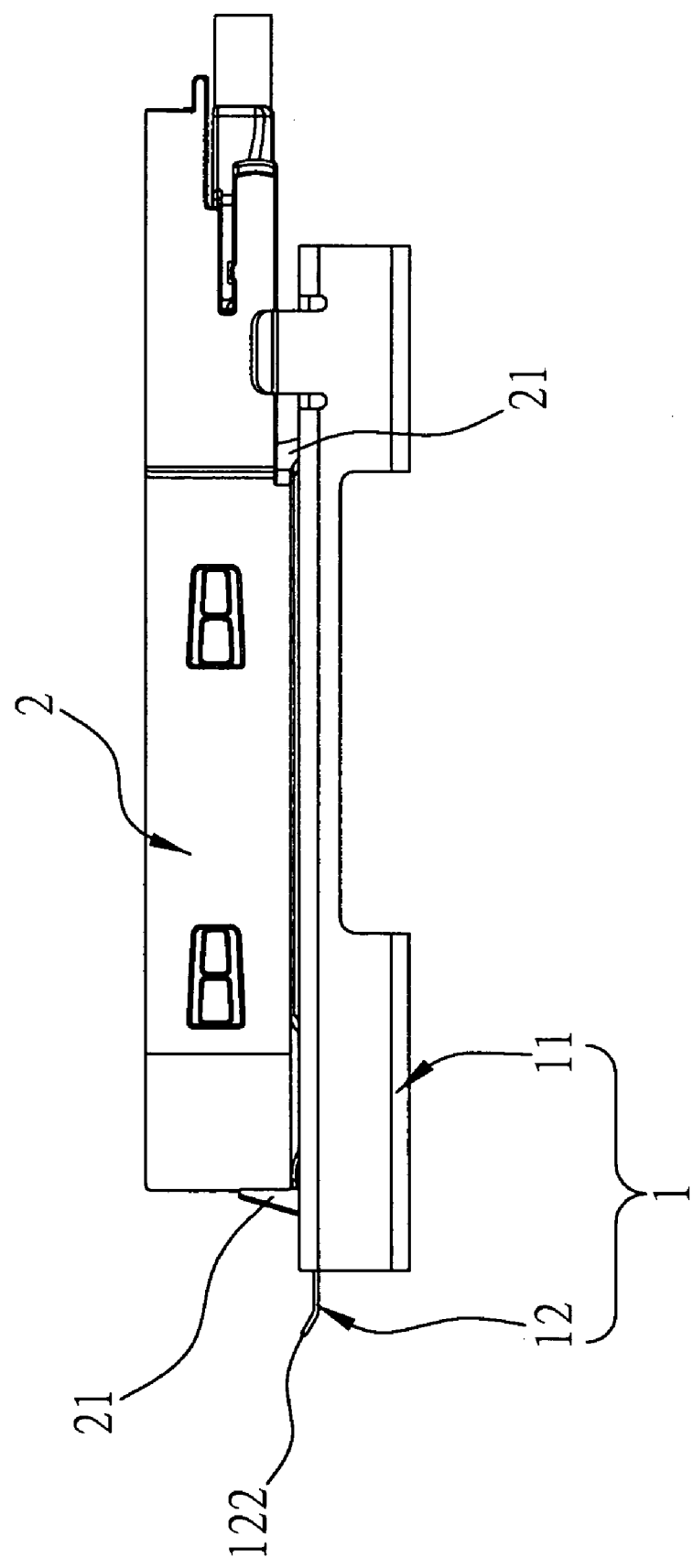
FIG. 3C depicts a left side view of the battery module fixture and the battery module shown in FIG. 2.
Figure 3D:
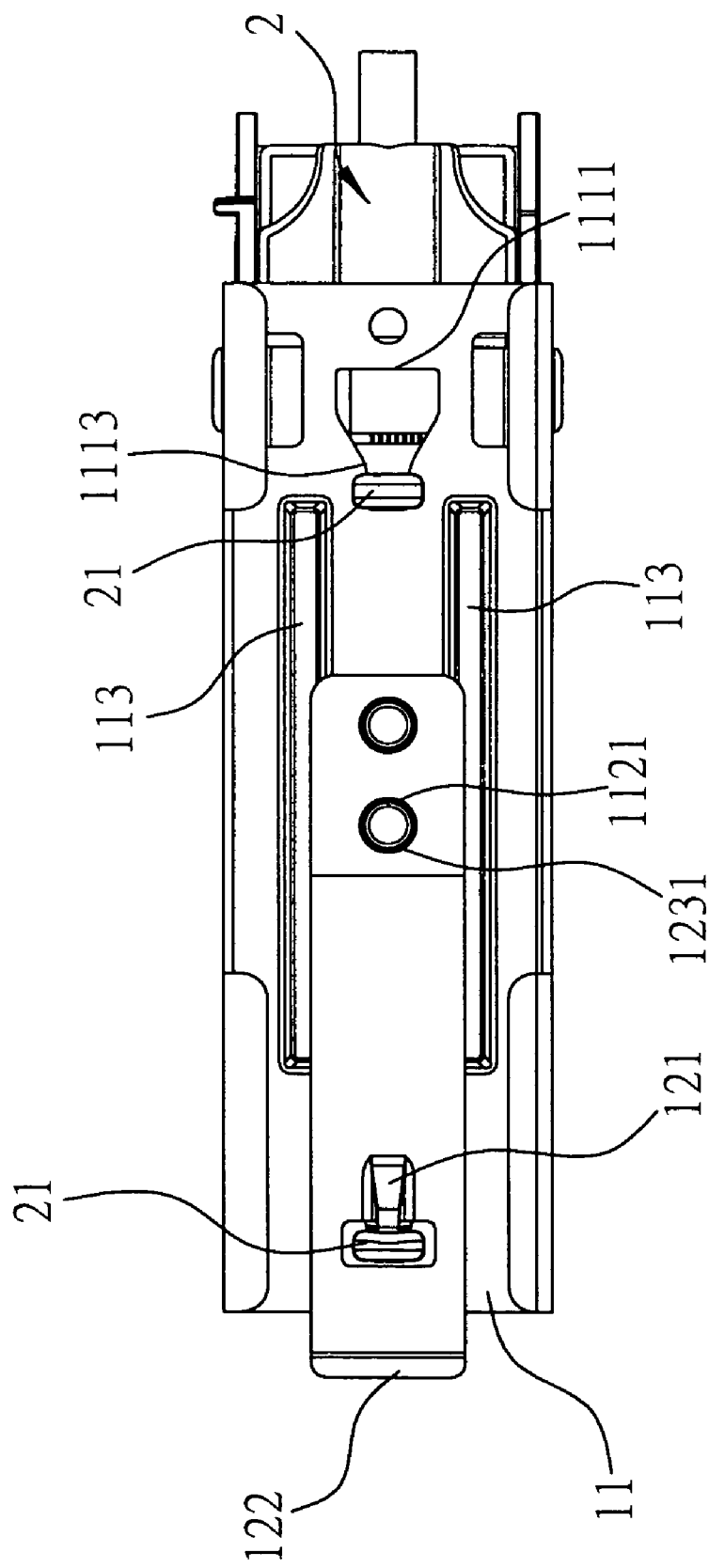
FIG. 3D depicts a bottom view of the battery module fixture and the battery module shown in FIG. 2.
Figure 3E:
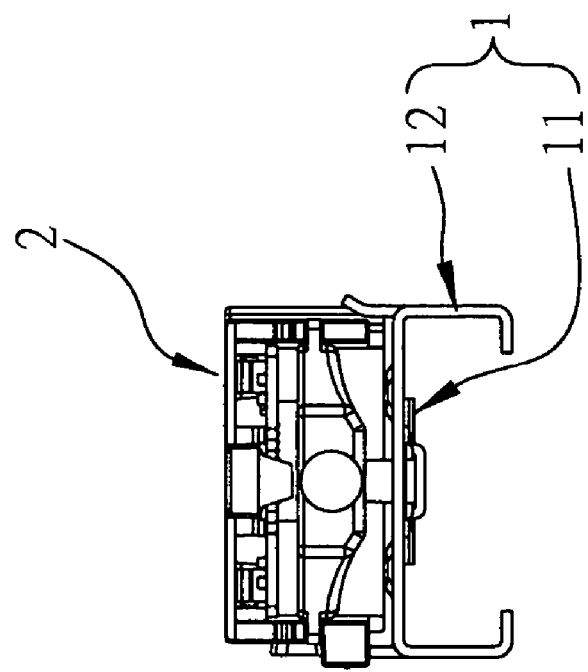
FIG. 3E depicts a front side view of the battery module fixture and the battery module shown in FIG. 2.
Figure 3F:
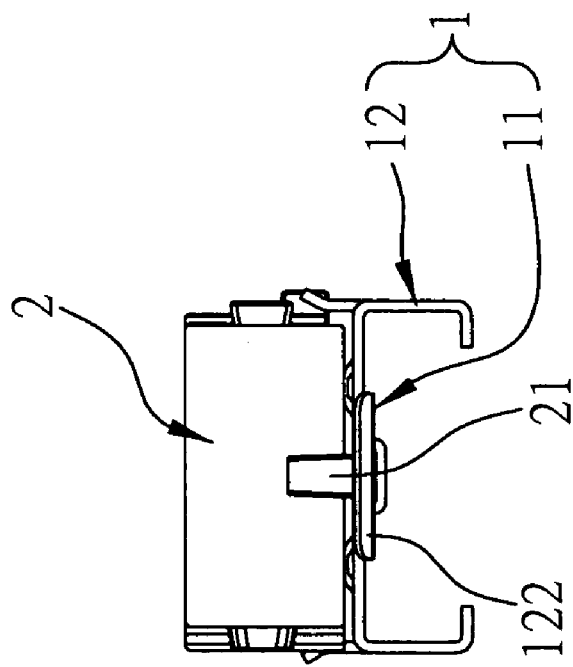
FIG. 3F depicts a rear side view of the battery module fixture and the battery module shown in FIG. 2.

The base 11 comprises a second positioning portion 111, and the second positioning portion 111 comprises a first end 1111 for engaging with the first positioning portion 21, and a second end 1113 connected to the first end 1111 for fixing to the first positioning portion 21. As shown in FIG. 1, the second positioning portion 111 is an opening, the first end 1111 is wider than the second end 1113 and the first positioning portion 21 is allowed to be inserted into and engaged with the first end 1111, the second end 1113 is relatively narrow for fixing to the first positioning portion 21. According to the preferred embodiment, the battery module 2 comprises two first positioning portions 21 (one of which is illustrated in FIG. 1, for example, by viewing the drawing from the left side, the other is illustrated in FIG. 2 and will be described below), and the base 11 has to comprise two second positioning portions 111 accordingly.

The base 11 further comprises a first bonding section 112, a track 113 and a second bonding section 114. The first bonding section 112 comprises two downwards extended first pilot holes 1121. The track 113 can be, e.g., a hopper chute, along which the battery module is guided to slide, and which makes the battery module 2 robust. The second bonding section 114 is used to bond itself to an electronic device such as a server (not illustrated). It should be understood that the second bonding section 114 comprises a plurality of second pilot holes 1141 according to the preferred embodiment, but the second bonding section 114 can have a structure changed according to a structure of the electronic device in another embodiment, and this is apparent to those skilled in the art, further description hereby omitted.

The spring member 12 comprises a third positioning portion 121 correspondingly located to the first end 1111, and an actuating portion 122 for being actuated to separate the third positioning portion 121 from the first end 1111. In the preferred embodiment, the spring member 12 is a leaf spring, the third positioning portion 121 is a lug that is formed by punching a portion of the spring member 12, the actuating portion 122 is buckled upwards from one end of the spring member 12 and wrapped downwards from the other end and is in the shape of a semicircle. Of course, the third positioning portion 121 is not limited to what described in the preferred embodiment, and can have a structure corresponding to the first end 1111, such as a stopper, a bearing rib, a lock or any other equivalent structures. Furthermore, the actuating portion 122 is not limited to having the shape of a semicircle, and can have a structure capable of being actuated to separate the third positioning portion 121 from the first end 1111 after being actuated by a user, and is not limited to what described in the preferred embodiment.

The spring member 12 further comprises a third bonding section 123, and the third bonding section 123 is capable of being bonded to the first bonding section 112 correspondingly. In the preferred embodiment, the third bonding section 123 comprises two holes 1231 for being bonded to the first pilot holes 1121 of the first bonding section 112 correspondingly, and the spring member 12 is thereby bonded to the base 11. However, the bonding structure between the first bonding section 112 and the third bonding section 123 is not limited to the concavo-convex cooperation described in the exemplary embodiment, in other exemplary embodiment, those skilled in the art can also employ, e.g., locking and hooking cooperation or other equivalent structure.

If the battery module 2 is desired to be fixed to the battery module fixture 1, referring to FIG. 2 in conjunction with FIG. 1, the two first positioning portions 21, one of which is installed on a left side of the battery module 2 and the other on a right side, are inserted into the first ends 1111 of the second positioning portion 111 first, and the battery module 2 is then shifted toward a direction indicated by an arrow A1; accordingly, the first positioning portion 21 is then fixed to the second end 1113 of the second positioning portion 111. Then the spring member 12 is to be bonded to the base 11. For example, the third positioning portion 121 of the spring member 12 is positioned on the first end 1111, and the holes 1231 of the third bonding section 123 are bonded to the first pilot holes 1121 of the first bonding section 112 correspondingly.

FIGS. 3A through 3F are six schematic diagrams showing the battery module fixture 1 and the battery module 2 when the battery module fixture 1 is fixed to the battery module 2. As shown in these figures, the first positioning portion 21 is fixed to the second end 1113 of the second positioning portion 111, the third positioning portion 121 of the spring member 12 is correspondingly in position fixed to the first end 1111 and is locked to the first positioning portion 21, the holes 1231 of the third bonding section 123 are correspondingly bonded to the first pilot hole 1121 of the first bonding section 112; at the same time, the spring member 12 is jointed to a bottom surface of the base 11, and the actuating portion 122 is disposed at a side of the base 11. Then, power can be provided to the cache memory of the electronic device after the second bonding section 114 is bonded to the electronic device such as the server (not shown in these figures).

Figure 4:
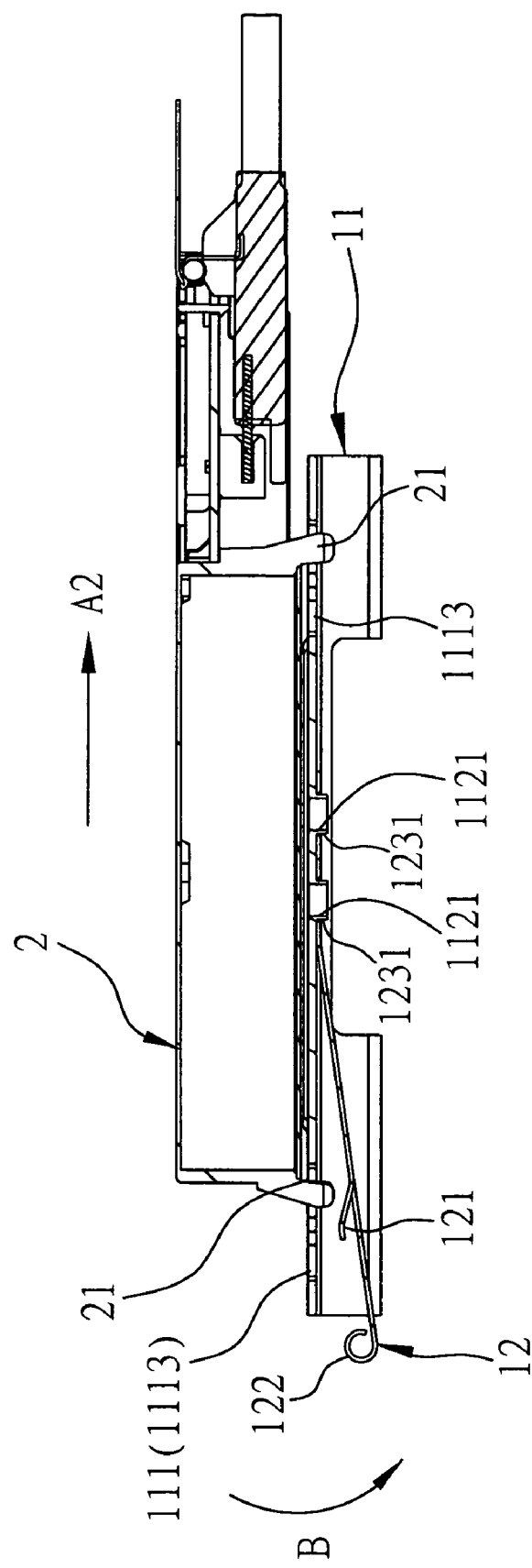
FIG. 4 depicts a cross-sectional view of the battery module fixture and the battery module shown in FIG. 1 when the battery module fixture is going to be broke away from the battery module.

If the battery module fixture 1 is desired to be separated away from the battery module 2, as shown in FIG. 4, a user is allowed to actuate the actuating portion 122 to move toward another direction indicated by an arrow B (which is downward in the preferred embodiment) with fingers first, and the spring member 12 of the third positioning portion 121 at a left side of FIG. 4 is therefore separated from the first end 1111 and is not locked to the first positioning portion 21 any more, and the first positioning portion 21 at the left side of FIG. 4 is separated from the second end 1113 of the second positioning portion 111; at the same time, a bonding state between the hole 1231 and the pilot hole 1121 is relieved by shifting the battery module 2 toward the direction A2, and the first positioning portion 21 at the right side of the drawing can be separated from the second end 1113 at the right side of FIG. 4, then the battery module 2 can be taken out.

It should be noted that the above-discussed assembly and disassembly is to described as illustrative and not restrictive of the present invention, and those skilled in the art can reverse the sequence of assembly and disassembly.

Compared with the conventional technology, the present invention can merely employ fingers to assemble the battery module fixture 1 to the battery module 2, and procedure of assembly is simple and can be completed rapidly, thereby solving the drawbacks, such that it may waste time and force, tools must be adopted in assembly/disassembly, and it is not easy to align when assembling, in the conventional technology. Therefore, assembly and disassembly can be performed without tools, and then assembly/disassembly can be performed quickly and simply, application of the present invention can perform can solve various drawbacks of the conventional technology.

The above-described exemplary embodiments are to describe various objects and features of the present invention as illustrative and not restrictive. A person of ordinary skilled in the art would recognize that modifications and changes could be made in form and detail without departing from the sprit and the scope of the invention. Thus, the right protective scope of the present invention should fall within the appended claim.

What is claimed is:

1. A battery module fixture applicable to a battery module having a first positioning portion, the battery module fixture comprising:
    a base comprising a second positioning portion having a first end for engaging with the first positioning portion, and a second end connected to the first end for fixing in position the first positioning portion; and
    a spring member capable of being coupled to the base, the spring member comprising a third positioning portion corresponding in position to the first end of the second positioning portion of the base, and an actuating portion for being actuated to separate the third positioning portion from the first end.

2. The battery module fixture of claim 1, wherein the second positioning portion is an opening.

3. The battery module fixture of claim 1, wherein the base further comprises a first bonding section capable of being bonded to the spring member, and a second bonding section capable of being bonded to an electronic device.

4. The battery module fixture of claim 3, wherein the first bonding section comprises a plurality of first pilot holes.

5. The battery module fixture of claim 3, wherein the second bonding section comprises a plurality of second pilot holes.

6. The battery module fixture of claim 1, wherein the spring member is a leaf spring.

7. The battery module fixture of claim 1, wherein the third positioning portion is one selected from the group consisting of a lug, a stopper, a bearing rib and a lock.

8. The battery module fixture of claim 1, wherein the actuating portion is buckled upwards from one end of the spring member and wrapped downwards from the other end of the spring member, and is in the shape of a semicircle.

9. The battery module fixture of claim 1, wherein the spring member further comprises a third bonding section.

10. The battery module fixture of claim 9, wherein the third bonding section comprises a plurality of holes.

* * * * *